(12) United States Patent
Galbreath et al.

(10) Patent No.: US 8,998,309 B2
(45) Date of Patent: Apr. 7, 2015

(54) VEHICLE SEAT ASSEMBLY HAVING A PERMEABLE CUSHION WITH A COLORED COATING AND METHOD OF MAKING THE SAME

(71) Applicant: Lear Corporation, Southfield, MI (US)

(72) Inventors: Ashford A. Galbreath, Troy, MI (US); Asad S. Ali, Troy, MI (US)

(73) Assignee: Lear Corporation, Southfield, MI (US)

( * ) Notice: Subject to any disclaimer, the term of this patent is extended or adjusted under 35 U.S.C. 154(b) by 120 days.

(21) Appl. No.: 13/738,418

(22) Filed: Jan. 10, 2013

(65) Prior Publication Data

US 2014/0191557 A1 Jul. 10, 2014

(51) Int. Cl.
B60N 2/58 (2006.01)
B60N 2/70 (2006.01)
B29C 37/00 (2006.01)

(52) U.S. Cl.
CPC .............. B60N 2/70 (2013.01); B60N 2/7017 (2013.01); B60N 2/58 (2013.01); B29C 37/0032 (2013.01); B29C 2037/0035 (2013.01)

(58) Field of Classification Search
None
See application file for complete search history.

(56) References Cited

U.S. PATENT DOCUMENTS

| | | | |
|---|---|---|---|
| 3,694,530 A | 9/1972 | Wolfe | |
| 3,751,111 A | 8/1973 | Taylor et al. | |
| 3,935,133 A | 1/1976 | van Leuwen et al. | |
| 4,268,557 A | 5/1981 | Bracesco | |
| 4,541,885 A | 9/1985 | Caudill, Jr. | |
| 4,571,319 A | 2/1986 | Baluch et al. | |
| 4,712,391 A | 12/1987 | Schimko | |
| 5,196,151 A * | 3/1993 | Sakaida et al. | ............... 264/46.7 |
| 5,368,368 A * | 11/1994 | Fukui et al. | .............. 297/452.18 |
| 5,370,831 A | 12/1994 | Blair et al. | |
| 5,389,317 A | 2/1995 | Grimmer | |
| 5,397,517 A | 3/1995 | Jay et al. | |
| 5,400,490 A | 3/1995 | Burchi | |
| 5,662,996 A | 9/1997 | Jourquin et al. | |
| 5,772,936 A | 6/1998 | Cavender | |
| 5,938,993 A | 8/1999 | Greene | |
| 5,989,699 A | 11/1999 | Kuczynski et al. | |
| 6,294,248 B1 | 9/2001 | Madan et al. | |
| 6,419,863 B1 | 7/2002 | Khac | |
| 6,444,303 B1 * | 9/2002 | Ali et al. | .................... 428/318.8 |
| 6,479,561 B1 | 11/2002 | Zhou et al. | |
| 6,623,675 B2 | 9/2003 | Kobayashi et al. | |
| 6,787,078 B2 | 9/2004 | English et al. | |
| 6,849,218 B1 | 2/2005 | De Winter et al. | |

(Continued)

FOREIGN PATENT DOCUMENTS

WO 9928107 A1 6/1999

*Primary Examiner* — David R Dunn
*Assistant Examiner* — Jody Giacoman
(74) *Attorney, Agent, or Firm* — Brooks Kushman P.C.

(57) ABSTRACT

In at least one embodiment, the present disclosure provides a vehicle seat assembly comprising a frame, a flexible foam cushion supported on the frame, the cushion having an outer surface comprising a major surface portion and a colored minor surface portion, a trim material secured over the cushion to cover the major portion of the surface, the colored minor portion of the outer surface being uncovered by the trim material, and the major surface portion of the cushion having a first permeability of 5 to 30 ml/cm$^2$/min. and the colored minor surface portion having a second permeability of at least 80% of the first permeability and the colored minor portion comprising a plurality of dried flexible in-mold colored coating disposed on discrete surface areas of the cushion.

20 Claims, 4 Drawing Sheets

(56) References Cited

U.S. PATENT DOCUMENTS

| | | |
|---|---|---|
| 6,861,019 B2 | 3/2005 | Ali et al. |
| 6,902,758 B2 | 6/2005 | Donatti et al. |
| 7,147,808 B2 | 12/2006 | Cowelchuk et al. |
| 2003/0098598 A1 | 5/2003 | English et al. |
| 2004/0082674 A1 | 4/2004 | Smith et al. |
| 2005/0019544 A1 | 1/2005 | Stacey et al. |
| 2005/0126478 A1 | 6/2005 | Donatti et al. |
| 2006/0024507 A1 | 2/2006 | Donatti et al. |
| 2006/0061001 A1 | 3/2006 | Wamshuis et al. |
| 2006/0141228 A1 | 6/2006 | Rearick et al. |
| 2006/0250000 A1 | 11/2006 | Fischer et al. |
| 2006/0273644 A1 | 12/2006 | Sturt et al. |
| 2007/0190301 A1 | 8/2007 | Saulnier |
| 2007/0246852 A1 | 10/2007 | DeBiasi et al. |
| 2007/0248789 A1* | 10/2007 | Smith et al. ............ 428/98 |
| 2007/0269607 A1* | 11/2007 | McRoberts et al. ....... 427/421.1 |
| 2008/0236448 A1* | 10/2008 | Shane ............ 106/38.2 |
| 2009/0127912 A1* | 5/2009 | Galbreath et al. ....... 297/452.18 |

* cited by examiner

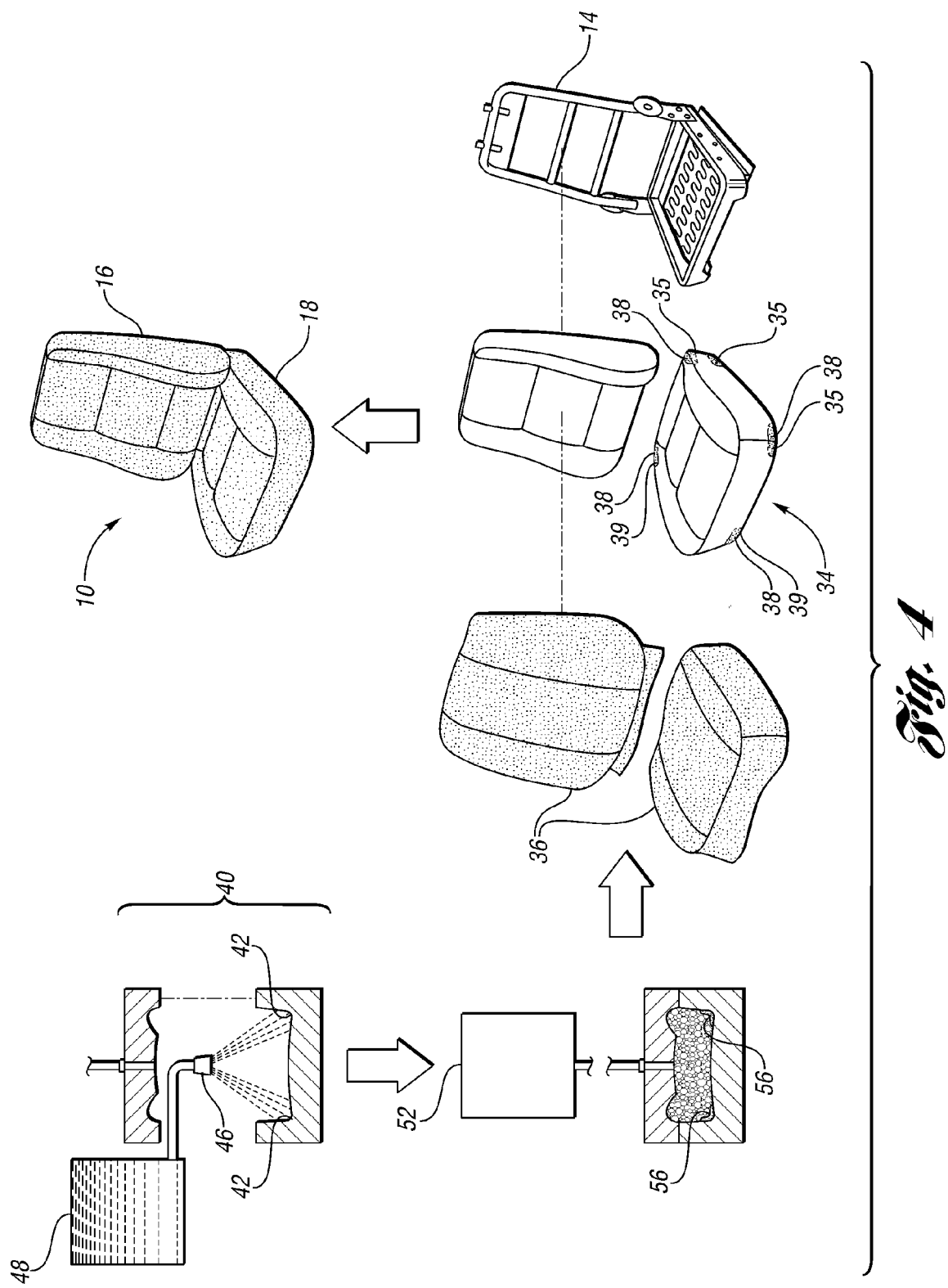

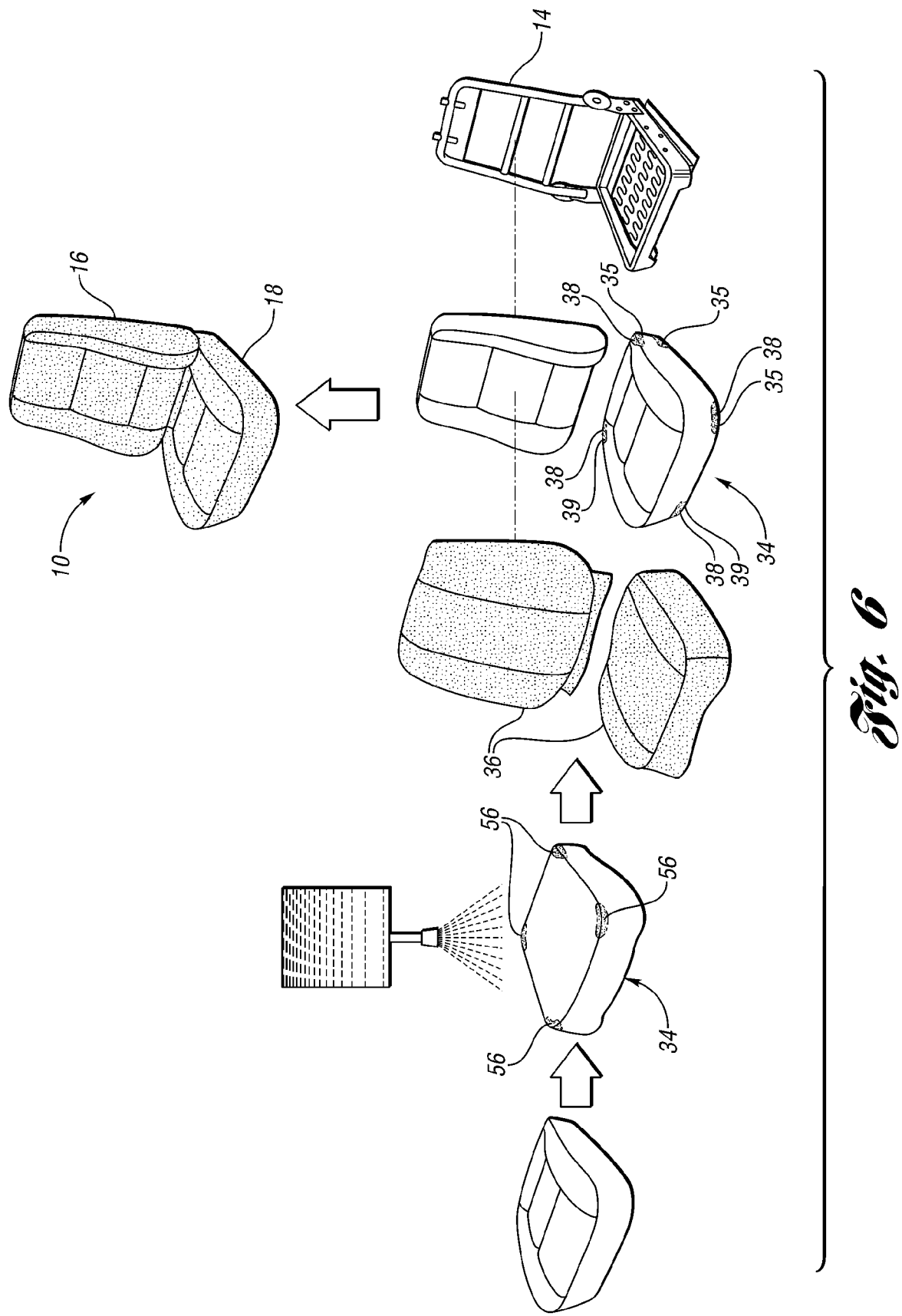

VEHICLE SEAT ASSEMBLY HAVING A PERMEABLE CUSHION WITH A COLORED COATING AND METHOD OF MAKING THE SAME

TECHNICAL FIELD

The present disclosure relates to a vehicle seat assembly having a permeable cushion with a colored coating and method of making the same. More specifically, in at least certain embodiments, the present disclosure relates to a vehicle seat assembly having localized regions of an in-mold coating to inhibit cushion show through and method of making the same.

BACKGROUND

Generally speaking, a vehicle seat assembly includes three fundamental components: (a) a frame to support the seat assembly and to mount it to a vehicle; (b) a foam cushion to cover the frame; and (c) trim material to cover the foam cushion and provide a durable surface for contact with a vehicle occupant. Typically, the foam cushion is made from an expandable foam material, such as polyurethane, and is molded to a predetermined shape during a molded process. The resulting molded cushion is typically a relatively light color such as white or yellow and has a grey scale rating of less than 30% grey (70% brightness) and in particular less than 20% grey (80% brightness). The resulting molded foam cushion also typically has a permeability of 5 to 30 ml/cm$^2$/min.

The trim material may include any number of materials, such as cloth, polymers, or leather. Often, the selection of trim material is governed by the sale price of the vehicle. For example, leather trim material may be used for luxury vehicles while cloth and polymeric materials may be used for less expensive vehicles. The trim material is secured over the cushion to cover the cushion however, often times there remains certain areas where the trim material does not completely cover the cushion. In these uncovered areas, because of the contrast of color between the trim material and the cushion, there can be cushion show through that is noticeable to vehicle occupants.

These areas of show through can occur in any number of areas, depending on a variety of factors such as, the design of the cushion, the trim material, and the trim material attachment scheme. Certain examples of some relatively likely show through areas are at the trim close out, i.e., in the corners or edges of the cushion where the trim material is wrapped, or places where clips and/or seat belt components are present.

Depending upon the relative colors of the trim material and the cushion, cushion show through may be visible at these uncovered locations. These uncovered areas are especially noticeable when the trim material is relatively dark, such as those having a grey scale rating of more than 30% grey (70% brightness), and in particular greater than 50% grey (50% brightness), such as the case for blue, black and brown trim.

Prior art techniques to overcome this have been attempted. Two such examples are U.S. Publication No. 2007/0248789 and U.S. Publication No. 2009/0127912. The '789 publication employs the use of a fluid impermeable coating, which when applied to a foam cushion would provide only a superficial coating on the cushion surface and would be susceptible to degradation during prolonged use. The '912 publication discloses polyurethane coatings formed by reaction that also stays on top of the cushion.

Accordingly, there is a need to provide a vehicle seat assembly which has a seat cushion and trim material of relative contrast that inhibits cushion show through which can be manufactured easily and relatively economically and remain darkened with a durable coating over prolonged use. Moreover, even in situations with light colored trim, it may be desirable to provide a vehicle seat assembly that masks the appearance of the light colored foam cushion.

SUMMARY

According to at least one aspect of the present disclosure, a vehicle seat assembly is provided. In at least one embodiment, the vehicle seat assembly comprises a vehicle seat assembly comprising a frame, a flexible foam cushion supported on the frame, the cushion having a permeability of 5 to 30 ml/cm$^2$/min, as measured by ASTM D3574 Method G, a surface area comprising a major portion and a colored minor portion, major and minor portions of the cushion having a permeability of 5 to 30 ml/cm$^2$/min, as measured by ASTM D3574 Method G, a trim material secured over the cushion to cover the major portion of the surface area, the colored minor portion of the surface area being uncovered by the trim material, the colored minor portion comprising a colored coating disposed on discrete portions of the surface area of the cushion, the colored coating comprising a dried flexible in mold lacquer coating.

According to one embodiment, the dried flexible in-mold coating comprise a water reducible or solvent borne pigmented lacquer in-mold coating composition.

According to another aspect of the present disclosure, a method for manufacturing a vehicle seat assembly is provided. In at least one embodiment, the method comprises providing a flexible cushion having a first permeability of 5 to 30 ml/cm$^2$/min. as measured by ASTM D3574 Method G, and providing an in-mold coating at predetermined locations of the cushion to form colored coatings disposed at the predetermined location on the cushion, the colored coatings having a second permeability being at least 80% of the first permeability. The method further comprises supporting the cushion on a frame, and securing a trim material over the cushion assembly supported on the frame. The trim material is sized such that the trim material, when secured over the cushion assembly, does not cover at least a portion of the coating, wherein the colored coating forms a first colored region on the cushion adjacent a second colored region such that the first colored region is darker in color than the second colored region, and wherein the color of the trim material is at least substantially similar to the first color.

BRIEF DESCRIPTION OF THE DRAWINGS

FIG. 4 is a schematic illustration of a method of making the vehicle seat assembly illustrated in FIG. 1;

FIG. 6 is a view similar to FIG. 4 illustrating another method.

DETAILED DESCRIPTION

As required, detailed embodiments of the present disclosure are disclosed herein. However, it is to be understood that the disclosed embodiments are merely exemplary of the disclosure that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present disclosure.

Moreover, except where otherwise expressly indicated, all numerical quantities in this description and in the claims are to be understood as modified by the word "about" in describing the broader scope of this disclosure. Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

Figure 1:
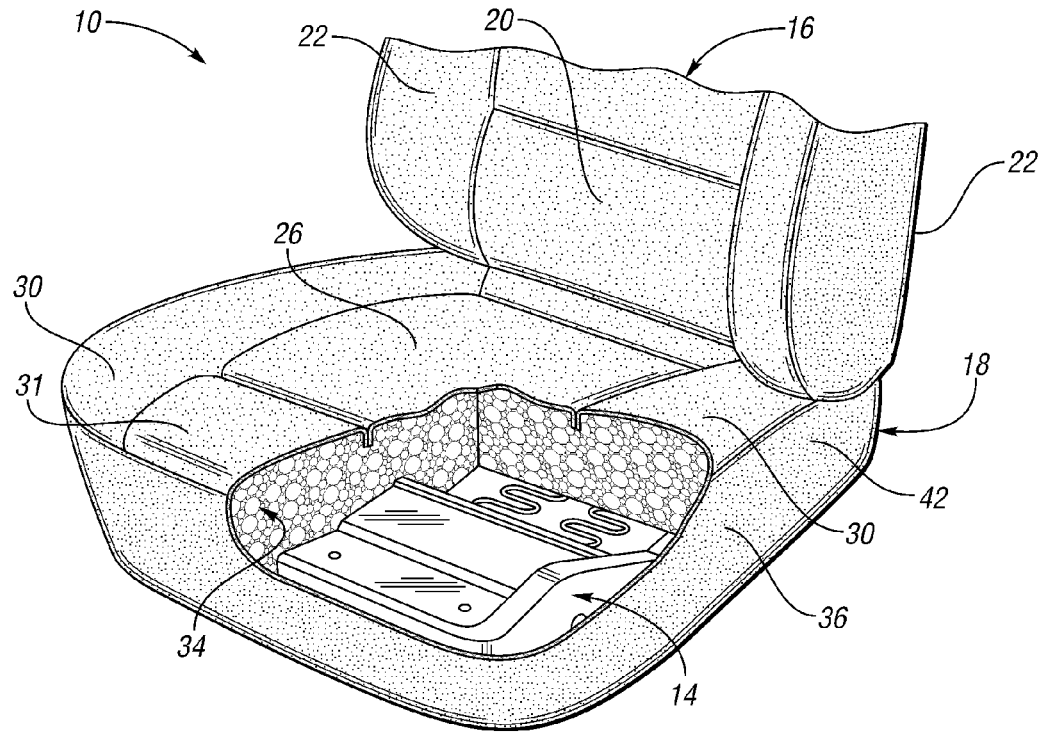
FIG. 1 is a cut-away environmental view of a vehicle seat assembly.

Referring now to the figures, where like numerals are used to designate like structure throughout the drawings, an illustrative schematic vehicle seat assembly is generally shown at 10 in FIG. 1. While the vehicle seat assembly 10 is illustrated in FIG. 1 to be a bucket seat assembly, it should be understood that the principles of the present disclosure are applicable to other types of seat assemblies, such as bench, captain, and other types of seat assemblies. It should also be understood that the principles of the present disclosure are applicable to other applications where foam and/or trim are components, such as back rests, back support pads, arm rests, and head restraints. Still further, it should be understood that the principles of this disclosure are applicable to all types of vehicle seat assemblies. Furthermore, it should be understood that the teachings of the multiple embodiments are not limited to applications on automobiles but may be employed on any type of vehicle including, without limitation, aircraft, watercraft, spacecraft, and other types of landcraft including trains as well as non-vehicle seat assemblies.

As shown in FIG. 1, the vehicle seat assembly 10 includes a seat frame, generally indicated at 14 having a plurality of mounting brackets (not shown) adapted to operatively secure the seat frame within a vehicle. The seat frame 14 may be constructed from any material suitable for application within a vehicle seat assembly 10, such as aluminum, steel or other metal alloy, composite material, or suitable polymer. Further, the seat frame 14 may be manufactured using techniques commonly known in the art, and relative to the type of material employed. By way of example, the manufacturing techniques may include stamping, welding, fastening or molding a suitable material to form a seat frame 14.

The vehicle seat assembly 10 comprises a seat back, generally indicated at 16, and a lower seat assembly, generally indicated at 18. In at least the illustrated embodiment, the seat back 16 includes a central back support pad 20 and side bolsters 22 on opposite sides of the pad 20. In at least the illustrated embodiment, the lower seat assembly 18 includes a central seating pad 26 and a plurality of bolsters 30 and 31 substantially surrounding at least two opposing sides, and as shown here, three sides, of the central seating pad 26. In the illustrated embodiment, bolsters 30 are located at opposite sides (i.e., inboard and outboard) of the lower seat assembly 18 and the bolster 31 is located at the front of the lower seat assembly 18 and extends between and connects the front portions of the bolsters 30.

In at least the illustrated embodiment, the seat back 16 and the lower seat assembly 18 each have the same type of cushion assembly covered by trim material. However, it should be understood that the configuration and/or type of the cushion assembly for the seat back 16 can differ from the configuration and/or type of the cushion assembly of the lower seat assembly 18. Likewise, it should be understood that the trim material for the seat back 16 can differ from the trim material for the lower seat assembly 18. In at least certain embodiments, the cushion assembly may include a structural member disposed over frame 14 and a cushion that is disposed over the structural member.

The vehicle seat assembly 10 further includes a back foam cushion (not shown) and a seat foam cushion generally indicated at 34. The back foam cushion and the seat foam cushion 34 are similar in construction and as such, only the seat foam cushion 34 will be discussed. The seat foam cushion 34 is conventionally secured to the seat frame 14 and/or a seat assembly infrastructure (not shown). The foam cushion 34 may be secured to the seat frame 14 and/or infrastructure by any method generally known in the art, such as by an adhesive. While the foam cushion 34 is illustrated to be a bucket-seat bottom cushion, it should be understood that the principles of the present disclosure can be applicable to any type of seat cushion, such as a seat back cushion for a bucket-seat and seat back and bottom cushion for bench seats, as well as other types of seats.

The cushion 34 can have any suitable size, shape and configuration, however in at least one embodiment, has an average thickness of 20 to 200 mm, in at least another embodiment of 30 to 70 mm, and in at least yet another embodiment of 40 to 160 mm. The cushion 34 can comprise any suitable cushion material, such as a suitable resilient polymer. In at least one embodiment, suitable cushion materials will have a density of 24 to 96 $Kg/m^3$, in another embodiment of 40 to 80 $Kg/m^3$, and in yet other embodiments of 55 to 65 $Kg/m^3$. Density of the cushion material can be measured by ASTM test method No. D3574.

In at least one embodiment, suitable cushion materials will have a hardness of 175 N (Newtons) to 400 N, in other embodiments of 225 to 350 N, and in yet other embodiments of 275 to 325N. Hardness of the cushion material can be measured by ASTM test method No. D3574.

In at least certain embodiments, the cushion material comprises a soft flexible foam, such as conventional polyurethane foam, soy-based foam, silicone, thermoplastic olefins, thermoplastic urethanes, and/or natural oil-based expanded polyurethanes and the like. In at least one embodiment, because of its environmentally friendly nature, soy-based polyurethane is preferred. Soy-based polyurethane can be made with any suitable soy-based polyols, such as those available, but not necessarily limited to, from Bayer, Urethane Soy Systems Corporation, and Dow Chemical. Any suitable soy-based polyurethane may be used, however in at least one embodiment, suitable soy-based polyurethanes include, but are not necessarily limited to those available from Renosol.

The vehicle seat assembly 10 also includes a trim material 36 which may be adapted to engage the foam cushion 34 (or cushions) in a covering relationship. The trim material 36 may include any suitable cover material. By way of example, some of the known materials include cloth, leather, or polymers of sufficient quality and thickness for use in seat trim applications. Polymer trim materials may include a flexible closed cell polymer skin material such as polyvinyl, polyvinyl chloride (PVC), thermoplastic olefin (TPO), or thermoplastic urethane (TPU).

Additionally, materials for use as trim material 36 may include a foam backing (not shown, but generally known in the art) which may be manufactured from a variety of polymer foam materials. By way of example, the foam backing may be polyethylene, polypropylene, polyurethane, or a polystyrene foam.

The trim material 36, by the manner in which it is secured to the cushion 34 and/or the frame 14 and/or other part of the seat assembly 10, while essentially covering the cushion 34 may not completely cover the cushion 34 and can result in uncovered areas 37 of the cushion 34. The uncovered areas 37 of the cushion 34 are most likely to be present in the corners 35 of the seat assembly 10 and areas 33 (FIG. 3) adjacent latches or other attachment devices, like seat belts, that extend from or adjacent the cushion 34, however it is to be understood that uncovered areas 37 could be present at any number of locations on the cushion 34. For instance, uncovered areas can also be likely present at the base of the head restraint/headrest where the trim cover closes out the area where the head restraint posts enter the foam headrest pad.

Figure 2:
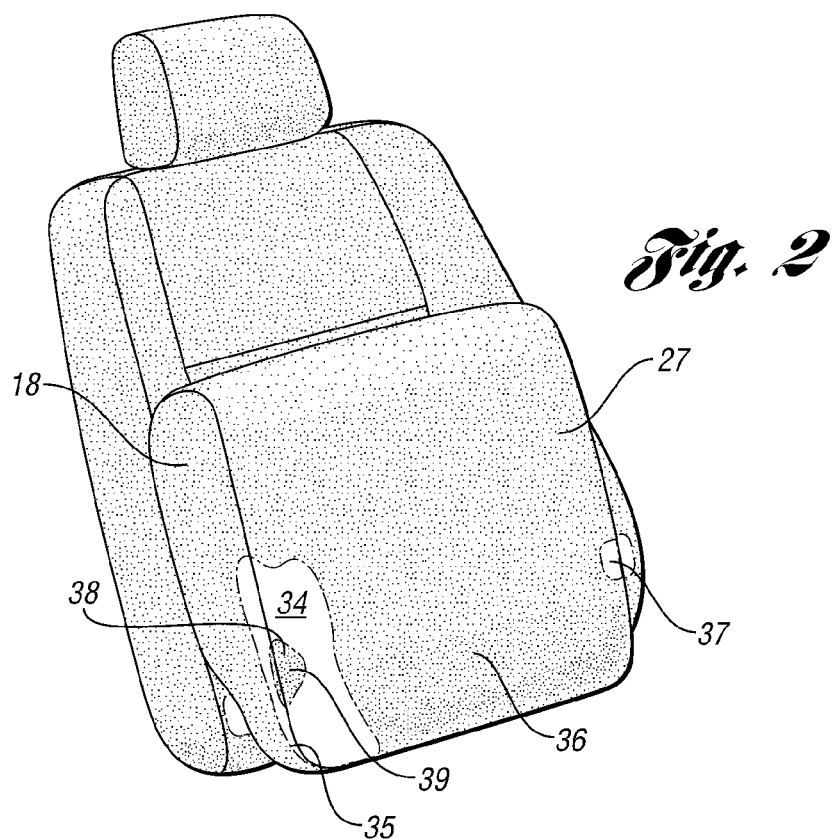
FIG. 2 is a cut-away perspective view of a vehicle seat assembly in accordance with an embodiment of the present disclosure.
Figure 3:
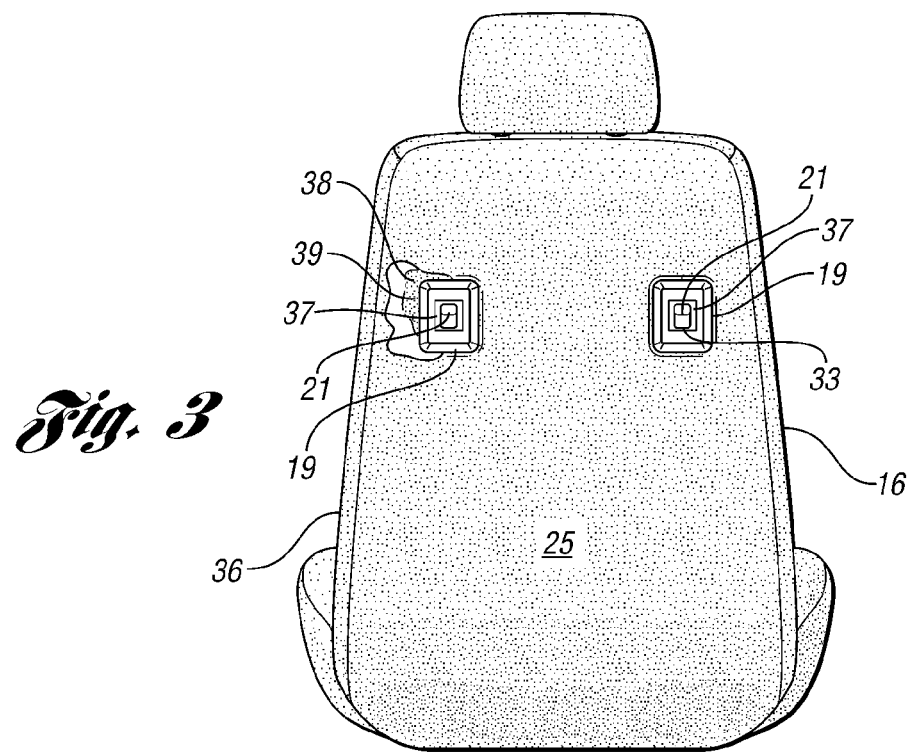
FIG. 3 is a cut-away perspective view of another vehicle seat assembly in accordance with an embodiment of the present disclosure.

Certain examples of likely occurrences of uncovered area 37 are shown in FIGS. 2 and 3. In FIG. 2, the lower seat assembly 18 has a bottom surface 27 that connects to a vehicle floor (not shown). The bottom surface 27, at the lower corners, has portions 37 adjacent a trim connector (not shown) that are uncovered. In FIG. 3, the back surface 25 of the seat back 16 has clips 21 having a housing 19 surrounding the clip 21. The clips 21 can be any type of attachment clip, such as a child seat clip. Between the clips 21 and the housing 19 are uncovered areas 37 of the cushion 34. For illustrative purposes, the trim material 36 adjacent the left side uncovered areas 37 have been cut-away to help show certain aspects of the principles of the present disclosure.

The uncovered areas 37 of the cushion 34 are such that if the color of the trim material 36 is appreciably different than the color of the foam cushion 34, cushion see through or show through can be appreciated by a passenger occupant. These uncovered areas 37 are especially noticeable when the trim material 36 is relatively dark, such as those having a grey scale rating of more than 30%, and in particular greater than 50%, such as the case for blue, black and brown trim. In certain instances, the difference in grey scale ratings of the trim material 36 and the cushion 34 can be 5 to 95% (5% brightness), in other embodiments 25 to 80% (20% brightness), and in yet other embodiments 30 to 60% (40% brightness).

In accordance with the present disclosure, portions of the foam cushion 34 are colored to reduce or alleviate foam cushion show through. In at least certain embodiments, at least some of the uncovered areas 37 of the seat cushion 34 are colored to form colored portions 38. As can be seen in the Figures, the colored portions 38 are adjacent to non-colored portions 15 of the surface of the foam cushion 34. While various examples of colored portions 38 are shown and described herein, the exact number and location of the colored portions 38 are expected to vary as needed. In at least one embodiment, the colored portions comprise 0.5 to 30% of the surface area of cushion 34, in another embodiment, 1 to 20%, and in yet other embodiments, 2 to 15%, based on the total surface area of the cushion 34.

The colored surface portions 38 of the cushion 34 can be provided in a variety of suitable manners. In at least one embodiment, paint or other colored coating, such as IMC (in-mold coating), are provided on selected portions, i.e., anticipated uncovered areas 37, of the surface of the foam cushion 34. The colored coating is illustrated as 39. While any suitable paint or other colored coatings could be used, in at least one embodiment, the colored coating is a water-reducible or solvent-borne pigmented in-mold lacquer coating. In at least one embodiment, grades of IMC that, when evaporating, pop to form bubbles, and thus make the coating more permeable, are used. Water-based coatings having a weight percent solids of 18% to 26% have been found to be particularly useful in certain embodiments. Solvent-based coatings having a weight percent solids of 10% to 18% have been found to be particularly useful in certain embodiments. In certain embodiments, the composition is used for the coatings can dry in a mold in 10-15 seconds at 150degrees Fahrenheit.

Any suitable pigment or liquid colorant can be used to provide the desired color. Examples of suitable liquid colorants include, but are not necessarily limited to, finely ground pigment dispersed in a liquid component.

In at least one embodiment, the colorant (i.e., pigment) is provided in an amount of 1 to 30 wt. %, based on the total weight of the colored coating composition, and in other embodiments an amount of 3 to 15 wt. %, based on the total weight of the colored coating composition.

While any suitable thickness of colored coating 39 can be used, in at least one embodiment, the colored coating is provided in an amount of an average thickness of 2 to 30 microns, in another embodiment of 5 to 25 microns, and in yet another embodiment of 10 to 20 microns. In at least one embodiment, the coatings 39 penetrate 0.10 to 1 micron into the foam.

In at least one embodiment, the colored coating 39 has a length of 0.25 to 400 cm and an average width of 5 to 150 mm. In at least another embodiment, the colored coating 39 has a length of 1 to 150 cm and an average width of 1 to 100 mm. In another embodiment, the colored coating 39 has a length of 3 to 20 cm and an average width of 3 to 30 mm. In yet another embodiment, the colored coating 39 has a length of 5 to 15 cm and an average width of 5 to 20 mm. The coating 39 is applied so as to match an area on the foam that is likely to be exposed by trim openings, i.e., uncovered areas 37, for closure, clip pass-through, and at the base of the trimmed foam cushion 34 when the seat is folded.

In at least one embodiment, the colored coatings 39 are such a color that they are substantially similar to the color of the trim material 36. In other embodiments, the colored coatings 39 and such a color that they are identical to the color of the trim material 36. In yet other embodiments, the colored coatings 39 are such a color that the color contrast between the trim material 36 and the cushion 34 is substantially alleviated, relative to the uncoated cushion portions 15. For instance, the color of the colored coating 39 can be close to the color of the trim material 36 such that the difference in grey scale between the coating(s) 39 and the trim material 36 is less than 25%, in other embodiments from 1 to 15%, and in yet other embodiments from 1 to 10%.

However, it should be understood that in some instances where the trim material 36 is light in color, it may be desirable to provide dark colored coatings 39 so that a dark color coating shows through instead of the foam material. This can result in a more "finished" appearance, and as such there may be instances where the difference in grey scale between the coatings 39 and the trim material 36 can be greater than 25% (75% brightness), in some embodiments from 50 to 80% (20% brightness), and in other embodiments from 60 to 95% (5% brightness).

In any event, the difference in grey scale ratings of the colored coating 39 and the remainder of the cushion 34 can be 5 to 95 (5% brightness), in other embodiments 25 to 80% (20% brightness), and in yet other embodiments 30 to 60% (40% brightness).

The colored coating 39 can be provided in any suitable manner. In at least the embodiment illustrated in FIG. 4, the colored coating 39 is deposited onto a cushion mold 40 at selected locations 42 via spraying. The desired colored coating composition is sprayed via a spray nozzle 46 which is in communication with a colored coating composition source 48. After the colored coating composition is sprayed onto the selected areas 42 of the mold 40 that would correspond to anticipated and/or actual uncovered areas 37 of the seat cushion 34, the mold 40 is then closed and foam forming materials from foam source 52 is introduced into the cavity 54 of the mold 40. The coating composition 56 within the cavity 54 is still uncured at this point. The foam forming material and the coating composition 56 are then cured to form a seat cushion 34 having colored coatings 39 at selected portions. The cushions 34 are then secured to a metal frame 14 with the trim cover 36 being secured thereon to form a seat assembly 10.

Figure 5:
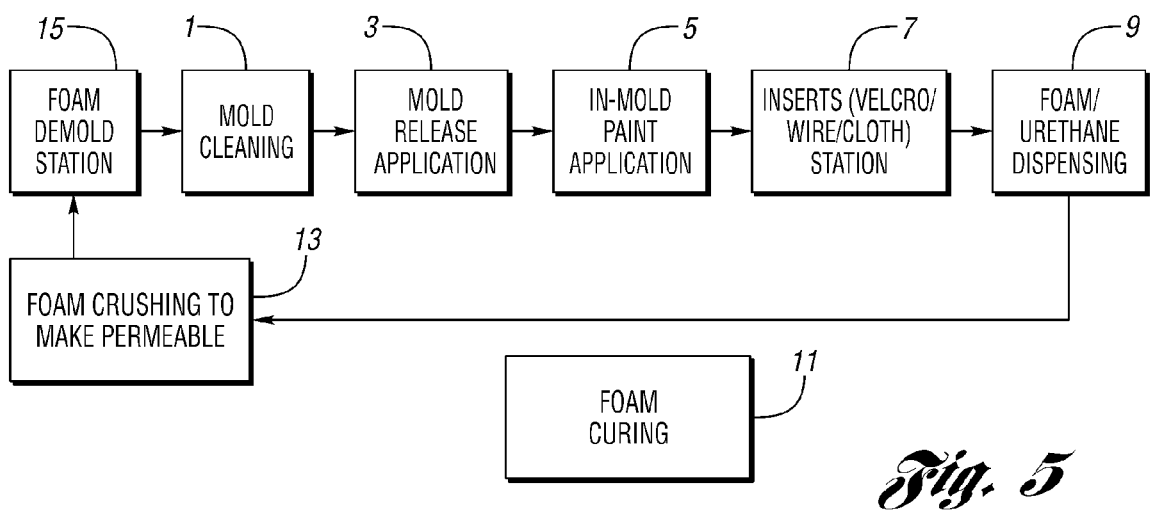
FIG. 5 is a flow diagram illustrating a portion of the method illustrated in FIG. 4.

FIG. 5 illustrates a schematic representation of the foam molding process. First the mold is cleaned 1 and then optional mold release application is applied 3 to the mold surfaces. An in-mold or other colored coating composition 5 is applied to selected portions of the mold. If necessary, inserts provided within the mold cavity 7 and then foam forming material such as urethane are dispensed 9 within the cavity of the mold. The foam and the in-mold paints or colored coating composition are then cured 11. The foam is then crushed 13 to create a desired level of permeability in the foam cushion 34. This level is at least 80% of the permeability of an uncoated foam cushion, such as 4 to 24 ml/cm²/min. In other embodiments, the foam is crushed or other wise processed to have a permeability of 80% to 95% of the permeability of an uncoated foam cushion, such as 4 to 28.5 ml/cm²/min., and in other embodiments of 84% to 92% of the permeability of an uncoated foam cushion, such as 4.2 to 27.6 ml/cm²/min. The level of permeability can be measured by ASTM test method No. D3574—Method G. Crushing can be accomplished in any suitable manner, such as by timed pressure release (TPR) or roller crush. Timed pressure release can be accomplished by opening a pressurized mold in a "burping" manner, (quickly relieving in-mold pressure) thereby popping closed foam cells leading to both open cell foam and perforating the coating layer. Vacuum crushing wherein we apply addition pressure in the mold and in-mold crush the foam, popping closed foam cells leading again to open foam cell structure and perforated coating. Roller crush can be accomplished by passing the finished molded foam with cured coating on the surface under rollers with either solid or brush like surfaces and an opening smaller than the foam depth to literally crush the foam pad popping the closed foam cells and perforating the coating on the surface simultaneously. The resulting cured foam cushion 34 having selected colored portions 38 is then de-molded 15. In at least one embodiment, total cycle time is 3-8 minutes.

In another embodiment, as best shown in FIG. 6, the seat cushion 34 is first formed and then the coatings 56 are sprayed at selected portions of the seat cushion 34. The coatings 56 are then cured on the cushion 34 to form the colored portion 38 of the cushion 34. The cushion 34 is then crushed to provide the desired level of permeability and then secured to the frame member 14 with the trim material 36 secured thereon to provide a seat assembly 10.

The present disclosure can provide environmental and cost benefits over dying or coloring the foam with added pigment. Less material leads to less cost and lower likelihood of environmental exposure of volatile organic emissions as the material cures and pigments when the material is landfilled or otherwise disposed of (i.e., incinerated).

While embodiments of the invention have been illustrated and described, it is not intended that these embodiments illustrate and describe all possible forms of the invention. Moreover, the words used in the specification are words of description rather than limitation, and it is understood that various changes may be made without departing from spirit and scope of the invention.

What is claimed is:

1. A vehicle seat assembly comprising:
   a frame;
   a flexible foam cushion supported on the frame;
   the cushion having an outer surface comprising a major surface portion and a colored minor surface portion;
   a trim material secured over the cushion to cover the major portion of the surface, the colored minor portion of the outer surface being uncovered by the trim material; and
   the major surface portion of the cushion having a first permeability of 5 to 30 ml/cm²/min. and the colored minor surface portion having a second permeability of at least 80% of the first permeability and the colored minor portion comprising a plurality of dried flexible in-mold colored coating disposed on discrete surface areas of the cushion.

2. The vehicle seat assembly of claim 1 wherein the colored minor surface portion is darker in color than the major surface portion and wherein the second permeability is 80% to 95% of the first permeability.

3. The vehicle seat assembly of claim 2 wherein the major surface portion is white or yellow.

4. The vehicle seat assembly of claim 2 wherein the colored minor portion comprises a plurality of spaced apart colored surface regions, wherein each of the colored surface regions is disposed at a respective uncovered surface portion of the cushion.

5. The vehicle seat assembly of claim 4 wherein the colored minor surface portion comprises 0.5 to 30% of the outer surface.

6. The vehicle seat assembly of claim 1 wherein the colored coating has an average thickness of 2 to 30 microns and wherein the second permeability is 80% to 95% of the first permeability.

7. The vehicle seat assembly of claim 2 wherein the dried flexible in-mold coating is a water reducible or solvent borne pigmented lacquer in-mold coating composition.

8. The vehicle seat assembly of claim 1 wherein the major portion of the surface has a first color and the colored minor portion having a second color darker than the first color, the different in grey scale between the first and second colors being 5 to 95% (5% brightness).

9. The vehicle seat assembly of claim 8 wherein the trim material has a third color, the third color being substantially similar to the second color.

10. A vehicle seat assembly comprising:
    a frame;
    a flexible foam cushion supported on the frame, the foam cushion having an average thickness of 20 to 200 mm;
    the cushion having an outer surface comprising a major surface portion and a colored minor surface portion;
    a trim material secured over the cushion to cover the major portion of the surface, the colored minor portion of the outer surface being uncovered by the trim material; and
    the major surface portion of the cushion having a first permeability of 5 to 30ml/cm2/min. and the colored minor surface portion having a second permeability of at least 80% of the first permeability and the colored minor portion comprising a plurality of dried flexible in-mold colored coating disposed on discrete surface areas of the cushion wherein the dried flexible in-mold coating is a water reducible or solvent borne pigmented lacquer in-mold coating composition.

11. The vehicle seat assembly of claim 10 wherein the colored minor surface portion is darker in color than the major surface portion, and wherein the second permeability is 80% to 95% of the first permeability.

12. The vehicle seat assembly of claim 11 wherein the major surface portion is white or yellow.

13. The vehicle seat assembly of claim 11 wherein the colored minor portion comprises a plurality of spaced apart colored surface regions, wherein each of the colored surface regions is disposed at a respective uncovered surface portion of the cushion.

14. The vehicle seat assembly of claim 13 wherein the colored minor surface portion comprises 0.5 to 30% of the outer surface.

15. The vehicle seat assembly of claim 10 wherein the colored coating has an average thickness of 2 to 30 microns.

16. The vehicle seat assembly of claim 10 wherein the major portion of the surface has a first color and the colored minor portion having a second color darker than the first color, the different in grey scale between the first and second colors being 5 to 95% (5% brightness) wherein the trim material has a third color, the third color being substantially similar to the second color.

17. A method of manufacturing vehicle seat assembly, said method comprising:
providing a flexible cushion having a first permeability of 5 to 30 ml/cm$^2$/min., providing an in-mold coating at predetermined locations of the cushion to form colored coatings disposed at the predetermined locations on the cushion, the locations of the cushion having the colored coatings having a second permeability being at least 80% of the first permeability;

supporting the cushion on a frame; and securing a trim material over the cushion assembly supported on the frame, the trim material being sized such that the trim material, when secured over the cushion assembly, does not cover at least a portion of at least one of the coatings;

wherein the colored coating forms a first colored region on the cushion adjacent a second colored region such that the first colored region is darker in color than the second colored region; and wherein the color of the trim material is at least substantially similar to the first color.

18. The method of claim 17 wherein the colored minor surface portion is darker in color than the major surface portion.

19. The method of claim 18 wherein the step of providing an in-mold coating at predetermined locations comprises spraying in-mold coating composition at selected locations of a cushion mold, pouring foam forming materials into the mold, heating the foam forming materials and the in-mold coating composition to form the cushion having colored coatings.

20. The method of claim 17 wherein the dried flexible in-mold coating is a water reducible or solvent borne pigmented lacquer in-mold coating composition.

* * * * *

UNITED STATES PATENT AND TRADEMARK OFFICE
CERTIFICATE OF CORRECTION

| | | |
|---|---|---|
| PATENT NO. | : 8,998,309 B2 | Page 1 of 1 |
| APPLICATION NO. | : 13/738418 | |
| DATED | : April 7, 2015 | |
| INVENTOR(S) | : Ashford A. Galbreath et al. | |

It is certified that error appears in the above-identified patent and that said Letters Patent is hereby corrected as shown below:

In the Claims

Column 8, Lines 50-51, Claim 8:

After "darker than the first color, the"
Delete "different" and
Insert -- difference --.

Column 9, Lines 25-26, Claim 16:

After "darker than the first color, the"
Delete "different" and
Insert -- difference --.

Signed and Sealed this
Twenty-ninth Day of September, 2015

Michelle K. Lee
*Director of the United States Patent and Trademark Office*